Patented July 28, 1936

2,049,004

UNITED STATES PATENT OFFICE 2,049,004

ART OF REFINING METALS

John W. Flannery, Portland, Oreg.

No Drawing. Application January 27, 1934, Serial No. 708,692. In Canada November 12, 1930

6 Claims. (Cl. 75—55)

This invention relates to the refining of metals, such as steel scrap, for the removal of undesirable ingredients such as oxygen and nitrogen from the metal while in a molten condition. This application is a continuation in part of my prior application Serial No. 410,633, filed November 29, 1929.

One object of the present invention is to provide a method of refining metals whereby the resultant metal has improved characteristics, having for example, greater tensile strength, etc.

Another object of this invention is to provide a method of refining metals which is more effective than those heretofore in use in the removal of undesired ingredients.

Another object of this invention is to provide a method of refining metals which is highly effective in reducing the amount of uncombined solid matter in the metal.

Another object of this invention is to provide a method of refining metals which is effective in reducing the amount of occluded gases existing in the refined metal.

Another object of this invention is to provide a method of refining metals which materially shortens the time required for the refining process over those heretofore in use.

Another object of this invention is to provide a method of refining metals which combines the refining period with the melting period so as to shorten the time consumed in producing the refined metal.

Another object of this invention is to provide a method of refining metals whereby the major portion, if not all, of the metal to be refined is brought into intimate lingering contact with a previously melted refining material.

Other objects will appear as the description of the invention proceeds.

The present invention is intended particularly for the refining of steel, and can be applied to the refining of cold-charged steel in an acid open-hearth or acid or basic electric furnace.

It has heretofore been the practice in the basic electric furnace to place the cold charge of metal in the furnace and first melt the entire charge and then refine the steel by the action of slag-forming materials on the top of the liquid bath. The making of refined steel in this way has therefore involved two distinct periods, the melting period, during which the entire charge is brought into a liquid state, and the refining period, during which the charge is refined by reason of the liquid metal of the charge being gradually brought into refining contact with the slag on top thereof by the convection currents existing in the liquid metal. The metal is charged directly into the furnace and the current turned on. When the charge is completely melted the liquid steel is covered by an oxidizing slag which is raked off, and a new slag is made by adding lime and coke dust or the like to the top of the liquid steel, lime and carbon being added from time to time until the steel is free from oxygen which has combined with the coke dust. Thereafter the lime and coke dust combine and form a liquid calcium carbide slag. But it is impossible to remove all of the oxygen from the bath of liquid steel in this way, and therefore occluded gases are unavoidably present in the refined metal.

An acid open-hearth furnace or an acid electric furnace is charged with cold steel scrap and heated to the melting point of the steel and when the steel is melted a suitable slag of lime or magnesite with silica is made to protect the surface of the metal from the oxidizing influence of the atmosphere of the furnace. This process does not refine the steel and hence can be used only with selected scrap.

In accordance with the present invention, the refining is accomplished simultaneously with the melting of the charge, and the impurities therein are more effectively removed from the metal by coming into intimate lingering contact with a liquid slag while in a finely divided condition. Suitable slag-forming materials, preferably silica and sodium carbonate together with the desired amount of calcium carbide, are charged into the furnace with the steel scrap. The amount of sodium carbonate and silica is such that a liquid slag containing calcium carbide is formed at about 2300° F., below the melting point of the steel to be refined. The metal as it melts then passes drop by drop through the slag layer, forming a bath of refined metal beneath the slag and protected thereby against oxidation by the furnace atmosphere.

Metallic calcium has a very great affinity for the impurities which it is desired to remove from the steel to be refined, such as phosphorus, sulphur, oxygen, nitrogen, etc., and will combine with these impurities with great rapidity, particularly if brought into intimate contact therewith. The carbon from the calcium carbide unites with the oxygen, whether in the form of occluded oxygen or oxides, in the melted steel and the calcium so freed combines with the several impurities for which it has a great affinity as heretofore pointed out, and therefore these impurities are rapidly and effectively removed as the melted metal passes in a finely divided condition through the refining layer. The amount of calcium carbide to be used must be such that after the oxygen is exhausted, there will be no substantial excess of carbon remaining to be absorbed by the steel. Practice has shown that five pounds of calcium carbide per ton of steel is sufficient.

As pointed out heretofore, the slag-forming materials are such as to melt at a slightly lower temperature than the steel to be refined, and these materials are charged into the furnace either in advance of any charge of metal or simultaneously with the first part of the charge of metal. Owing to the lower melting temperature of the slag-forming materials they melt before the metal and form a liquid bath at the bottom of the furnace. Even if all of the slag-forming materials have not melted before the metal starts to melt, the first melted metal coming into contact therewith will complete the liquefaction of the refining materials. The presence in the slag-forming materials of alkali metal compounds, sodium carbonate being the most readily available, together with silica in the proper amounts, results in formation of a liquid slag at a temperature below the melting point of the metal, the sodium carbonate and silica lowering the melting point of the mixture. The slag is viscous, and the liquid metal coming into contact therewith is broken into fine particles and passes therethrough with lingering contact therewith, accumulating below the refining layer in the bottom of the furnace, where it is kept liquid by the highly heat-conductive character of the refining layer.

As the metal passes through the slag, ample opportunity is afforded for the impurities, whether solid or gaseous, to be brought intimately into contact with materials having a high affinity therefor, whereby a highly efficient separation of these impurities from the metal is effected. Additionally, the refining layer acts as a mechanical filter and scours from the surfaces of each particle of molten metal passing therethrough such impurities as are carried thereon. Moreover, as the liquid metal accumulates below the refining layer it is in contact therewith at its upper surface, and therefore the period for abstraction of impurities from the liquid metal is prolonged.

Cold steel scrap contains considerable iron oxide in the form of scale and rust. Each drop of melted metal thus carries a small amount of iron oxide which combines with the phosphorus and sulphur in the metal and these drops, coming in contact with the liquid slag in tiny particles, give up the combined iron oxide, phosphorus and sulphur along with the other impurities. Thus when the entire charge is melted, the metal has been effectively cleansed of its impurities by its passage through the refining layer and exists as a molten bath in the bottom of the furnace, with the bath covered by a protecting blanket of slag, which may be on the order of one-half inch or more in thickness. If the refined metal is not at a sufficiently high temperature to be poured, the slag should be maintained as a reducing slag, by the methods now in general use, until the metal is ready to pour. Also, the high heat conductivity of the refining layer permits the bath of metal to be brought rapidly to the necessary temperature for pouring so that in some cases the actual time consumed in making refined steel is not much greater than that heretofore consumed during the melting period alone.

As an example of a suitable slag-forming and refining mixture, the following proportions may be stated (per ton of steel scrap to be refined):

| | Pounds |
|---|---|
| Calcium carbide ($CaC_2$) | 5 |
| Silica ($SiO_2$) | 3.8 |
| Sodium carbonate ($Na_2CO_3$) | 1.2 |

This mixture melts and forms a liquid slag layer at a temperature of approximately 2300° F. whereas the melting point of the steel to be refined is 2500° F. The amount of calcium carbide desirable will not be substantially less than 5 pounds per ton of steel, but it may exceed this value when making high carbon steel, and in such case the silica and sodium carbonate will be increased in proportion. Since the silica and sodium carbonate are primarily for the purpose of forming a liquid slag at a temperature below the melting point of the metal, their relative proportions may vary considerably and other alkali metal compounds may be used, provided always that this result is secured. Usually it will be found suitable to use silica and sodium carbonate which together are equal in amount to the calcium carbide.

Experience has demonstrated that steel refined in conformity with the process herein set out is much superior in quality to metal refined by the processes now in use. The metal has a fine grain and fine texture and tests have demonstrated that it possesses increased tensile strength and other desirable qualities. It is also relatively free of occluded gases and other impurities.

It will, therefore, be perceived that a novel method of refining steel has been provided which not only improves the quality of the metal but also materially reduces the time, because it is no longer necessary to make the metal in two stages, one wherein the metal is melted and the second wherein it is refined, because the refining is taking place simultaneously with the melting and the entire method takes little, if any, longer than the melting period of methods now in use. By bringing the melted metal in finely divided drops into intimate contact with the refining material, a more complete removal of impurities is effected, and once removed the metal is protected from reabsorption of the impurities, because the method is not prolonged much if any beyond the time when the metal has melted and passed through the refining layer and hence there is little or no opportunity for the refined metal to reabsorb gases and impurities by being brought into contact with the slag layer by convection currents in the molten metal. Therefore, the refined metal is relatively free of occluded gases and other impurities.

What is claimed is:

1. A method for refining steel which consists in charging cold steel scrap together with a mixture of slag-forming materials into a furnace, said mixture comprising calcium carbide, silica and a low melting alkali metal compound in proportions such that the mixture forms a liquid slag at a temperature below the melting point of the steel, then applying heat to the charge to melt said mixture and form a liquid slag layer in the bottom of the furnace before the metal melts, the metal melting as the temperature increases and passing drop by drop through the liquid slag and forming a bath of molten metal beneath the slag.

2. A method for refining steel which consists in preparing a mixture of slag-forming materials including calcium carbide together with sufficient silica and alkali metal compound to form a liquid slag at a temperature below the melting point of the steel, charging cold steel scrap together with said mixture into a furnace and applying heat to the charge to increase the temperature to the melting point of the metal, said mixture forming a liquid slag and the metal melting thereafter as the temperature increases and passing through the slag to the bottom of the furnace.

3. A method for refining steel which consists in in charging cold steel scrap together with a mixture of slag-forming materials into a furnace, said mixture containing not less than five pounds of calcium carbide per ton of steel to be refined and sufficient silica and low-melting ingredients of the alkali metal compound group to provide a liquid slag at a temperature below the melting point of the steel, then applying heat to the charge to melt said mixture and form a liquid slag layer in the bottom of the furnace before the metal melts, the metal melting as the temperature increases and passing drop by drop through the liquid slag and forming a bath of molten metal beneath the slag.

4. A method for refining steel which consists in charging cold steel scrap together with a mixture of slag-forming materials into a furnace, said mixture containing not less than five pounds of calcium carbide per ton of steel to be refined and sufficient silica and low melting alkali metal compound to form a liquid slag at a temperature of about 2300° F., then applying heat to the charge to melt said mixture and form a liquid slag layer in the bottom of the furnace before the metal melts, the metal melting as the temperature increases and passing drop by drop through the liquid slag and forming a bath of molten metal beneath the slag.

5. A method for refining steel which consists in charging cold steel scrap together with a mixture of slag-forming materials into a furnace, said mixture containing calcium carbide, silica and sodium carbonate in the approximate proportions of five pounds calcium carbide, 3.8 pounds silica, and 1.2 pounds sodium carbonate per ton of steel to be refined, then applying heat to the charge to melt said mixture and form a liquid slag layer in the bottom of the furnace before the metal melts, the metal melting as the temperature increases and passing drop by drop through the liquid slag and forming a bath of molten metal beneath the slag.

6. A method for refining steel which consists in charging cold steel scrap together with a mixture of slag-forming materials into a furnace, said mixture containing calcium carbide, silica and sodium carbonate, the amount of calcium carbide being not less than five pounds per ton of steel to be refined, and the combined silica and sodium carbonate being approximately equal in amount to the calcium carbide, then applying heat to the charge to melt said mixture and form a liquid slag layer in the bottom of the furnace before the metal melts, the metal melting as the temperature increases and passing drop by drop through the liquid slag and forming a bath of molten metal beneath the slag.

JOHN W. FLANNERY.